A. H. HARRIS.
VEHICLE SPRING.
APPLICATION FILED OCT. 16, 1919.
1,333,977. Patented Mar. 16, 1920.
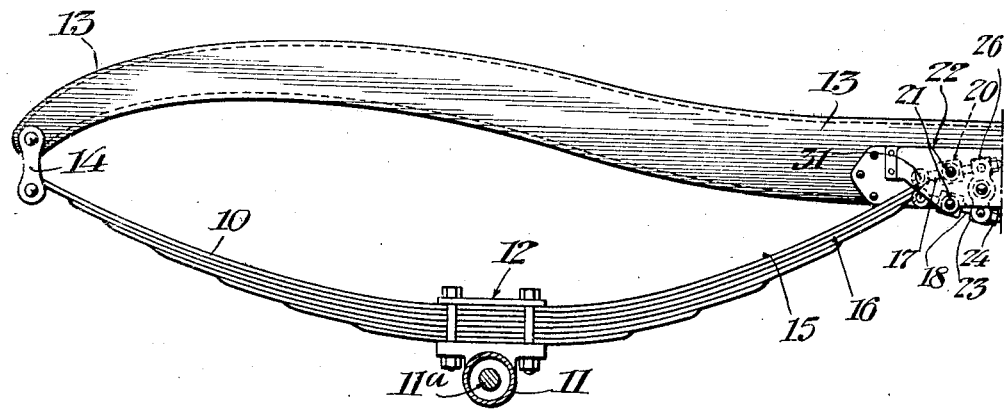
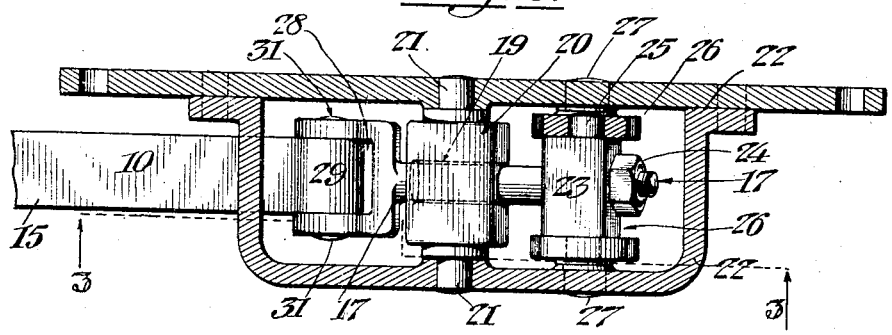
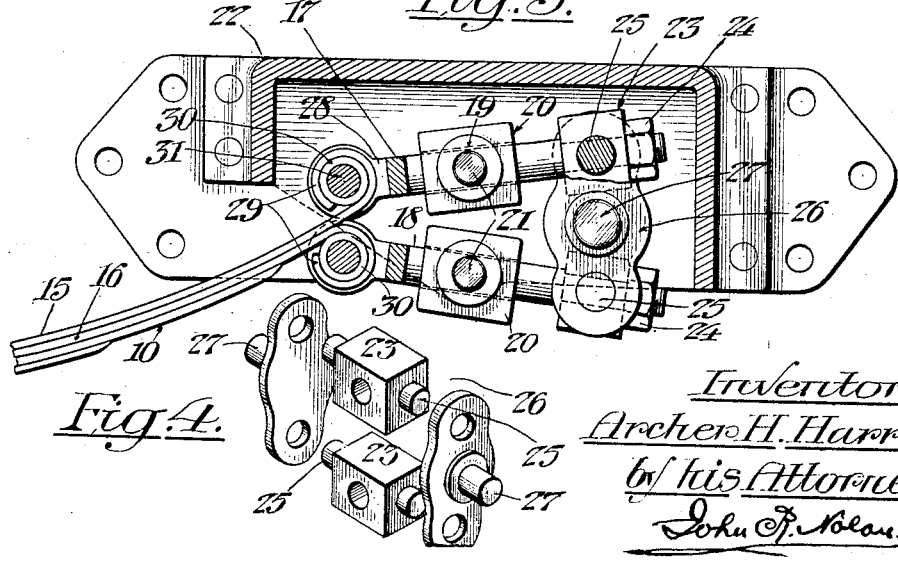
Inventor:
Archer H. Harris.
by his Attorney
John J. Nolan.

UNITED STATES PATENT OFFICE.

ARCHER H. HARRIS, OF BARBERTON, OHIO.

VEHICLE-SPRING.

1,333,977.  Specification of Letters Patent.  Patented Mar. 16, 1920.

Application filed October 16, 1919. Serial No. 330,969.

*To all whom it may concern:*

Be it known that I, ARCHER H. HARRIS, a citizen of the United States, and resident of Barberton, in the county of Summit and State of Ohio, have invented certain new and useful Improvements in Vehicle-Springs, of which the following is a specification.

This invention relates to laminated springs for motor driven and other vehicles.

My invention, more specifically stated, consists in the provision of a series of thrust members which flexibly connect the adjacent leaves of the spring, at one end thereof, to an equalizing member on the vehicle structure, all said members being so constructed and relatively arranged that the thrust members have capacity for longitudinal motion and are constrained to move simultaneously in opposite directions to each other by the relative longitudinal movement of the said leaves.

The invention also comprises novel features of construction and combinations of parts which will be hereinafter described, and the scope of the invention then be defined in the appended claims.

In the drawings—

Figure 1 is a side elevation of a vehicle spring equipped with a compensating connection embodying my invention, so much of the vehicle being shown as is necessary to illustrate the improvement.

Fig. 2 is a horizontal section, enlarged, through the housing of the compensating connection.

Fig. 3 is a longitudinal vertical section, as on the line 3—3 of Fig. 2.

Fig. 4 is a skeleton perspective view of the equalizing lever and its associated blocks for the link members.

Referring to the drawings, 10 designates a laminated steel spring rigidly secured midway between its ends to the fixed axle casing 11 of a motor driven vehicle by means of a clamp connection 12; the axle being designated 11ª. One end of the spring is shackled to the frame 13 of the vehicle, as at 14, and two (or more) superposed leaves or plates 15, 16 of the spring at the opposite end thereof are connected to the frame through the medium of my improved compensating device. This device in the form illustrated comprises two associated converging arms 17, 18, each having capacity for combined sliding and oscillatory motion. The body of each arm extends slidably through a transverse opening 19 in a block 20 having horizontal end trunnions 21 which are supported in suitable bearings. In the present instance, these trunnions having their bearings in the walls of a housing 22 which is bolted or otherwise secured to the frame of the vehicle. The axes of oscillation of the respective blocks are in vertical alinement with each other and are so positioned that the arms diverge forwardly, that is to the right as viewed in Figs. 1 and 3. The forward or divergent ends of the arms are reduced and extended through a pair of pivotally mounted blocks 23, such ends being screw-threaded and provided with nuts 24 which detachably lock the arms to the proximate blocks. These blocks 23 are pivotally supported by end trunnions 25 having their bearings in the upper and lower arms respectively of a vertical lever 26 which is fulcrumed, as by studs 27, in the walls of the housing. This lever, which constitutes an equalizing lever, is preferably composed of two spaced apart members, in and between which the blocks 23 are mounted.

The rearward or converging ends of the two arms 17, 18 are bifurcated, as at 28, for the reception of terminal eyes 29 on the extremities of the upper and lower leaves 15, 16 respectively of the spring, said eyes preferably embracing sleeves 30 on cross-pins 31 supported in and between the end lugs of the respective arms.

By the above-described construction and arrangement of parts it will be seen that the arms 17, 18 have capacity not only for longitudinal movement within the blocks 20 but also for concurrent oscillatory movement about the axes of the respective blocks, and that said arms thus constitute links which flexibly connect the extremities of the spring leaves with the respective upper and lower arms of the equalizing lever. It will also be seen that a longitudinal thrust on either of said links, occasioned by the relative longitudinal movement of the superposed leaves 15, 16 of the spring, will be transmitted through the equalizing lever to and longitudinally of the other link, but in an opposite direction. Hence while the links freely permit and insure the fore-and-aft sliding movements of the leaves 15, 16 relatively to each other, resulting from the compression or the rebound of the spring, yet fore or aft sliding movement of the spring as a whole is prevented by the counter end thrust, effected through the oppositely-related equalizing lever, of the links on the respective leaves of the spring.

My improved compensating spring member effectually performs the function of a driving medium in connection with laminated springs wherein two or more leaves are required to carry an equal amount of the fore-and-aft thrust of the driving force.

It is to be understood that my invention is not limited to the exact construction herein disclosed, as the same may be modified within the principle of the invention and the scope of the appended claims.

I claim:—

1. The combination, with a vehicle having frame and axle elements, of a laminated spring, and connections between said spring and the respective elements, one of said connections including a plurality of longitudinally-movable thrust members to which the adjacent ends of a like number of superposed leaves of the spring are connected, and an equalizing device mounted on the adjacent element and coupling said members, in such a manner that the longitudinal movement of one of said members is transmitted in an opposite direction to the other of said members.

2. The combination, with a vehicle having frame and axle elements, of a laminated spring, and connections between said spring and the respective elements, one of said connections including a plurality of longitudinally-movable thrust arms to which the adjacent ends of a like number of superposed leaves of the spring are connected, and an equalizing lever to the respective limbs of which the said arms are connected, said lever being mounted on the adjacent element, in such a manner that the longitudinal movement of one of said arms is transmitted in an opposite direction to the other of said arms.

3. The combination, with a vehicle frame and axle, and a laminated spring having its body connected to the axle and having one end connected to the frame, of a compensating connection between the other end of the spring and the frame, said connection including a plurality of longitudinally-movable thrust members to which the adjacent ends of a like number of superposed leaves of the spring are connected, and an equalizing device mounted on the frame and coupling the respective members, in such a manner that the longitudinal movement of one of said members is transmitted in an opposite direction to the other of said members.

4. The combination, with a vehicle frame and axle, and a laminated spring having its body connected to the axle and having one end connected to the frame, of a compensating connection between the other end of the spring and the frame, said connection comprising spaced guide members mounted to oscillate on the frame, a pair of diverging thrust arms to the proximate ends of which superposed leaves of the spring are connected, said arms being slidably supported by the said guide members, an equalizing lever supported on the frame, and pivotal connections between the respective limbs of the lever and the divergent ends of the thrust arms.

5. The combination, with a vehicle frame and axle, and a laminated spring having its body affixed to the axle and having one end shackled to the frame, of a compensating connection between the other end of the spring and the frame, said connection comprising a housing affixed to the frame, spaced guide members pivotally supported in said housing, a pair of diverging thrust arms to the proximate ends of which the superposed leaves of the spring are hingedly connected, said arms being slidably supported by said guide members, an equalizing lever having a relatively fixed axis of oscillation, and pivotal block connections between the respective limbs of the lever and the divergent ends of the thrust arms.

Signed at Cleveland, in the county of Cuyahoga and State of Ohio, this 14th day of October, A. D. 1919.

ARCHER H. HARRIS.